April 26, 1927.
P. M. ULLRICH
1,626,107
DEVICE FOR HOLDING REGISTRATION CARDS ON AUTOMOBILES
Filed May 7, 1925
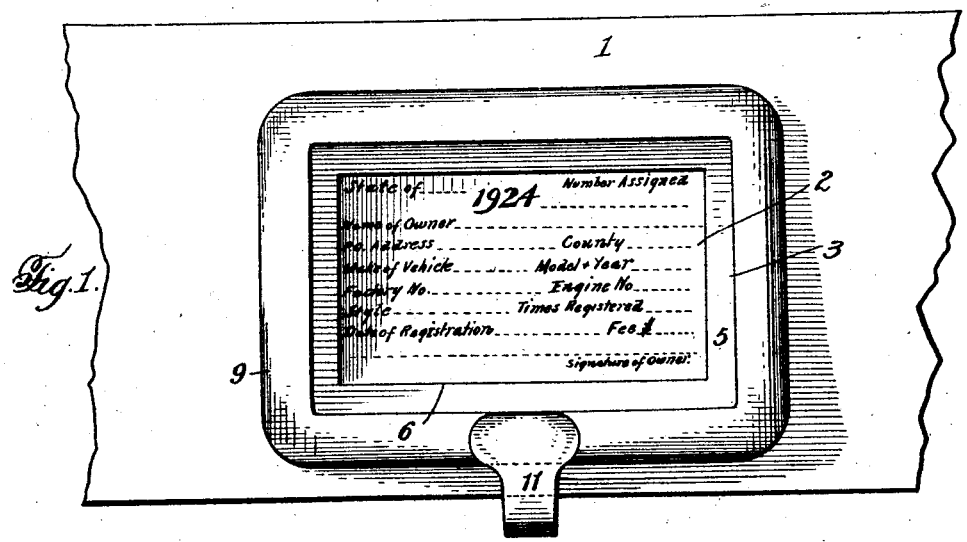
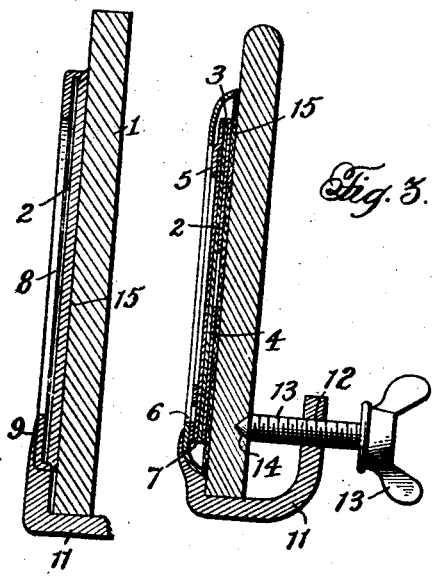
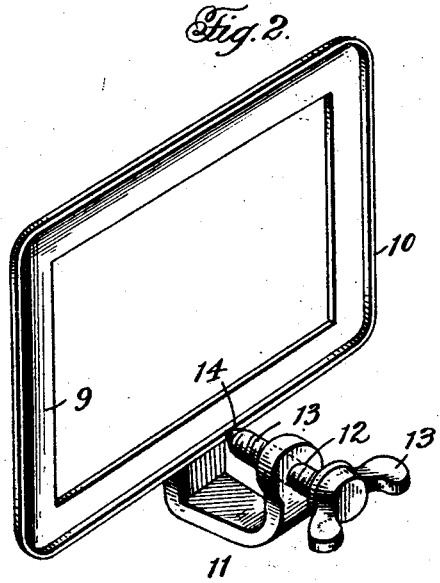
Inventor:
Peter M. Ullrich Patented Apr. 26, 1927.

1,626,107

UNITED STATES PATENT OFFICE.

PETER M. ULLRICH, OF WAVERLY, IOWA.

DEVICE FOR HOLDING REGISTRATION CARDS ON AUTOMOBILES.

Application filed May 7, 1925. Serial No. 28,617.

My invention relates to new and useful improvements in automobile accessories and more particularly to a clamp or frame for securing a registration or like card to an automobile in such a position that it may be readily viewed, the principal object of the invention residing in the provision of such a device of simple and inexpensive construction that may be easily connected to or disconnected from the automobile without marring the same.

Another object of the invention consists in the provision of a clamp or frame so constructed and shaped that a registration or similar card may be positioned on the instrument board of an automobile, a portion of the clamp or frame extending beneath the lower edge of the board and the securing means engaging the rear face thereof and being at all times out of sight.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is a face view showing the frame attached to the instrument board of the automobile.

Fig. 2 is a perspective of the frame.

Fig. 3 is a transverse vertical section through the frame and instrument board with parts shown in elevation, and Fig. 4 is a transverse vertical section through the frame and instrument board showing a slightly modified form of the invention.

In a number of States laws have been passed requiring that the registration or similar cards of automobiles be displayed at all times and I have perfected an improved form of device whereby such a card may be easily attached to or detached from the instrument board so as to be in plain view at all times, the device being so constructed that it may be connected to the instrument board or other part of the automobile without marring the same and presenting a pleasing appearance to the observer. My improved form of frame is adapted for use either in connection with the receptacle for receiving the card or to directly attach the card itself in position without the use of an auxiliary receptacle.

In the drawings 1 indicates the instrument board or other suitable part of the automobile and 2 the registration card which is adapted to be positioned for observation. In Figs. 1 and 3 of the drawings I have illustrated the card as being held in a container designated 3, said receptacle being of any desired construction but as illustrated more particularly in Fig. 3 comprising the back plate 4, the front flange 5 forming the opening 6 and an opening 7 being provided at the bottom, between the flange 5 and back plate 4, so that the card 2 may be easily inserted as well as a covering strip 8 of isinglass or similar material.

My improved form of attaching device comprises the frame 9 with the flange 10, the frame and flange being of such a size as to readily receive the receptacle containing the registration or similar card and clamp the same upon the supporting object such as the instrument board. The flange is of such a height that the frame will engage the outer edge of the receptacle whereas the flange will engage the face of the support as illustrated more particularly in Fig. 3 of the drawings. Formed on the lower edge of the frame 9, intermediate the ends thereof, is the U-shaped bracket 11 which is adapted to engage beneath the lower edge of the instrument board, as more particularly illustrated in Figs. 1 and 3, a threaded opening 12 being formed in said bracket 11 to receive the thumb screw 13. The frame will be secured upon the instrument board or other support by adjusting the screw to engage the inner face of the support and the inner end of the screw is preferably pointed as shown at 14 so as to bite into the support and prevent accidental displacement of the frame. In order that the face of the instrument board or support will not be scratched or otherwise marred by the clamping of the frame I provide the pad shown at 15. If desired small spots of adhesive might be provided on the pad to connect the same to the support. This pad is of such a size as to be engaged by the flange 10.

In Fig. 4 of the drawings I have shown the frame as being used for supporting the card when not positioned in an auxiliary receptacle or container. In all other respects the invention is the same with the exception that in Fig. 4 I have shown the flange 10 of the frame as extending at straight right angle from the frame whereas in the other form of the invention the flange is formed by slightly curving the edge of the frame.

My improved form of attaching device may be formed either by casting or by punching and may be of such material as is desirable and that will present a pleasing appearance. I do not desire to limit myself to any particular material nor any particular manner of manufacturing.

From the above it will be readily seen that I have provided a clamping device or frame which may be readily connected to or disconnected from the parts of the automobile without marring. Where registration cards are issued yearly new cards may be easily positioned and there will be no unsightly screws or other securing devices used which would also mar the supporting part of the automobile. As will be seen by reference to the drawings that vertical arm of the bracket 11 which is connected to the frame is of such a height that the lower edge of the frame will be positioned slightly above the lower edge of the support and the horizontal arm of the bracket is of such a width that the upper face thereof engaging the lower edge of the support will prevent any swinging movement of the frame and will hold the same straight at all times.

Having fully described my invention what I claim as new and desire to secure by Letters Patent is:

1. A device of the character described, adapted for positioning a card upon a support, including an open front frame having a flange adapted to extend around the edge of the card and engage the face of the support for clamping the card between the frame and support, a bracket associated with the frame and adapted to extend beneath the edge of the support, and means carried by the bracket and engageable with the support for detachably connecting the frame thereto.

2. In combination with a receptacle adapted to contain a card, a device adapted for positioning said receptacle upon the instrument board of an automobile, said device including an open face frame adapted to extend around and engage the edges of the receptacle and allowing a view of the card therethrough, the edges of the frame engaging the instrument board, a bracket associated with the frame and adapted to extend beneath the lower edge of the instrument board, and means carried by the bracket and engageable with the rear face of the instrument board for securing the frame thereto.

In testimony whereof I hereunto affix my signature.

PETER M. ULLRICH.